United States Patent
Kapoor et al.

(10) Patent No.: US 9,960,670 B2
(45) Date of Patent: May 1, 2018

(54) APPARATUS FOR CHARGE RECYCLING (71) Applicant: NXP B.V., Eindhoven (NL)

(72) Inventors: Ajay Kapoor, Eindhoven (NL); Kristóf László Blutman, Eindhoven (NL); Jose de Jesus Pineda de Gyvez, Eindhoven (NL); Hamed Fatemi, Eindhoven (NL)

(73) Assignee: NXP B.V., Eindhoven (NL)

( * ) Notice: Subject to any disclaimer, the term of this patent is extended or adjusted under 35 U.S.C. 154(b) by 44 days.

(21) Appl. No.: 15/052,509

(22) Filed: Mar. 11, 2016

(65) Prior Publication Data
US 2017/0264189 A1 Sep. 14, 2017

(51) Int. Cl.
*H02M 3/335* (2006.01)
*H02M 3/04* (2006.01)

(52) U.S. Cl.
CPC ......... *H02M 3/04* (2013.01); *H02M 3/33561* (2013.01)

(58) Field of Classification Search
None
See application file for complete search history.

(56) References Cited

U.S. PATENT DOCUMENTS

| | | | |
|---|---|---|---|
| 5,867,040 A | 2/1999 | Fuse et al. | |
| 6,479,974 B2 * | 11/2002 | Cohn | H01L 23/5286 257/E23.153 |
| 6,864,668 B1 * | 3/2005 | McCune | H03F 1/0227 323/266 |
| 7,329,968 B2 * | 2/2008 | Shepard | H02J 1/08 307/18 |
| 8,339,177 B2 | 12/2012 | Jarrar et al. | |
| 8,476,962 B2 | 7/2013 | Pelley | |
| 8,878,387 B1 | 11/2014 | Wong et al. | |
| 2001/0012219 A1 * | 8/2001 | Lee | G11C 16/30 365/189.09 |
| 2005/0127756 A1 | 6/2005 | Shepard et al. | |
| 2006/0119390 A1 | 6/2006 | Sutardja | |
| 2008/0042722 A1 * | 2/2008 | Dornbusch | H03K 19/01851 327/333 |
| 2010/0259299 A1 * | 10/2010 | Dennard | H03K 3/00 326/80 |
| 2011/0271126 A1 * | 11/2011 | Hill | G06F 1/3203 713/320 |
| 2011/0298440 A1 | 12/2011 | Chang et al. | |
| 2013/0106395 A1 * | 5/2013 | Del Croce | G05F 3/02 323/315 |

(Continued)

OTHER PUBLICATIONS

"A Practical Guide to Low-Power Design"; retrieved from the internet https://www.si2.org/ . . . /PowerForward/ LowPowerGuide09232009/ . . . /lpg on Nov. 18, 2015; 110 pages (Jun. 5, 2009).

(Continued)

*Primary Examiner* — Jeffrey Gblende (57) ABSTRACT

One example discloses an apparatus for charge recycling between a first power-domain operating at a first voltage and a second power-domain operating at a second voltage, including: a first power-delivery circuit configured to supply the first voltage to the first power-domain; and a second power-delivery circuit coupled to receive power from both the first power-delivery circuit and the first power-domain; wherein the second power-delivery circuit is configured to supply the second voltage to the second power-domain.

13 Claims, 8 Drawing Sheets

(56) References Cited

U.S. PATENT DOCUMENTS

| | | | |
|---|---|---|---|
| 2013/0131771 A1 | 5/2013 | Lehmann et al. | |
| 2014/0268917 A1 | 9/2014 | Ma et al. | |
| 2014/0340142 A1 | 11/2014 | Wong et al. | |
| 2015/0346742 A1 | 12/2015 | Kapoor et al. | |
| 2015/0355662 A1 | 12/2015 | Myers et al. | |
| 2016/0182051 A1* | 6/2016 | Yang | H03K 19/01851 327/333 |
| 2017/0090493 A1* | 3/2017 | Cui | G05F 1/575 |

OTHER PUBLICATIONS

"Lecture 13—Digital Circuits (III), CMOS Circuits"; 17 pages; Spring 2007.

Andersen, Toke M. et al; "A 4.6 W/mm2 Power Density 86% Efficiency On-Chip Switched Capacitor DC-DC Converter in 32 nm SOI CMOS"; Twenty-Eighth Annual IEEE Applied Power Electronics Conference and Exposition, Long Beach, CA, USA; pp. 692-699 (Mar. 2013).

Hwang, Sanghoon et al; "Velocity Saturation Effects in a Short Channel Si-MOSFET and its Small Signal Characteristics"; Journal of the Korean Physical Society, vol. 55, No. 2; pp. 581-584 (Aug. 2009).

Lee, Sae Kyu et al; "A 16-core voltage-stacked system with an integrated switched-capacitor DC-DC converter"; 2015 Symposium on VLSI Circuits Digest of Technical Papers; 2 pages (2015).

Lee, Sae Kyu et al; "Evaluation of Voltage Stacking for Near-Threshold Multicore Computing"; ISLPED' 12, Redondo Beach, CA, USA, pp. 373-378 (Aug. 2012).

Liu, Yong et al; "A 0.1pJ/b 5-to-10Gb/s Charge-Recycling Stacked Low-Power I/O for On-Chip Signaling in 45nm CMOS SOI"; IEEE ISSCC 2013/Session 23/Short-Reach Links, XCVR Techniques, & PLLS; pp. 400-402 (Feb. 20, 2013).

NXP, B.V.; Blutman et al; "Level Shifter and Approach Therefor" U.S. Appl. No. 14/794,411;33 pages (Jul. 8, 2015).

NXP, B.V.; Kapoor et al; "Configurable Power Domain and Method" U.S. Appl. No. 14/794,485, not yet published; 32 pages (Jul. 8, 2015).

NXP, B.V.; Kapoor, Ajay; "Power-Domain Current Balance"; U.S. Appl. No. 14/973,575; 31 pages (Dec. 17, 2015).

Nxp, B.V.; Kapoor, Ajay; "Power-Domain Optimization"; U.S. Appl. No. 14/973,616; 41 pages (Dec. 17, 2015).

Rajapandian, Saravanan et al; "High-Voltage Power Delivery Through Charge Recycling"; IEEE Journal of Solid-State Circuits, vol. 41, No. 6; pp. 1400-1010 (Jun. 2006).

Schaef, Christopher et al; "Efficient Voltage Regulation for Microprocessor Cores Stacked in Vertical Voltage Domains"; IEEE Transactions on Power Electronics, vol. 31, No. 2; pp. 1795-1808 (Feb. 2016).

Ueda, Kazuhiro et al; "Low-Power On-Chip Charge-Recycling DC-DC Conversion Circuit and System"; IEEE Journal of Solid-State Circuits, vol. 48, No. 11; pp. 2608-2617; (Nov. 2013).

* cited by examiner

APPARATUS FOR CHARGE RECYCLING

The present specification relates to systems, methods, apparatuses, devices, articles of manufacture and an architecture for charge recycling.

SUMMARY

According to an example embodiment, an apparatus for charge recycling between a first power-domain operating at a first voltage and a second power-domain operating at a second voltage, comprising: a first power-delivery circuit configured to supply the first voltage to the first power-domain; and a second power-delivery circuit coupled to receive power from both the first power-delivery circuit and the first power-domain; wherein the second power-delivery circuit is configured to supply the second voltage to the second power-domain.

In another example embodiment, the first voltage plus the second voltage is greater than a maximum operational voltage of the first power-delivery circuit.

In another example embodiment, the second power-delivery circuit is configured to be coupled between the first power-domain and the second power-domain.

In another example embodiment, the second power-delivery circuit is configured to isolate the first and second power-domains from each other.

In another example embodiment, one of the first or second power-domains include a digital circuit and another of the first or second power-domains include an analog circuit.

In another example embodiment, the first power-delivery circuit includes a battery.

In another example embodiment, the second power-delivery circuit includes either a boost converter or a switch mode power supply.

In another example embodiment, at least one of the power-delivery circuits includes an up voltage-converter or down voltage-converter.

In another example embodiment, the second power-delivery circuit includes either a linear regulator.

In another example embodiment, further comprising an energy storage element configured to exchange power with the second power-delivery circuit.

In another example embodiment, the energy storage element and the second power-delivery circuit are configured to source or sink current with respect to either the first power-delivery circuit or the first power-domain.

In another example embodiment, the energy storage element is a capacitor.

In another example embodiment, the capacitor includes a capacitance at least at least three orders of magnitude greater than a total capacitance of the apparatus.

In another example embodiment, further comprising a set of level-shifters configured to translate voltage levels between the first and second power-domains.

The above discussion is not intended to represent every example embodiment or every implementation within the scope of the current or future Claim sets. The Figures and Detailed Description that follow also exemplify various example embodiments.

Various example embodiments may be more completely understood in consideration of the following Detailed Description in connection with the accompanying Drawings, in which:

While the disclosure is amenable to various modifications and alternative forms, specifics thereof have been shown by way of example in the drawings and will be described in detail. It should be understood, however, that other embodiments, beyond the particular embodiments described, are possible as well. All modifications, equivalents, and alternative embodiments falling within the spirit and scope of the appended claims are covered as well.

DETAILED DESCRIPTION

Figure 1A:
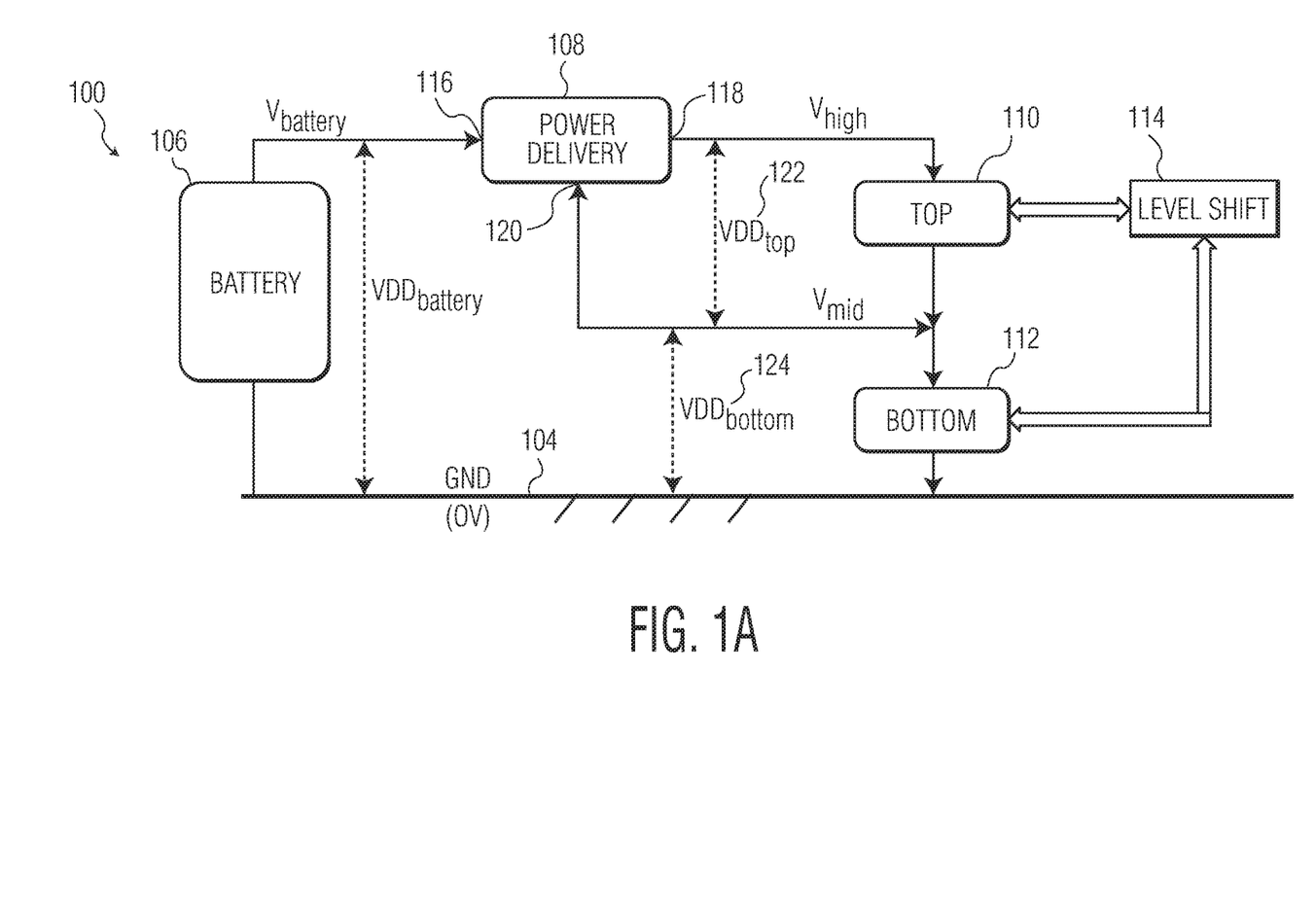
FIGS. 1A and 1B are first and second examples of an apparatus for charge recycling.
Figure 1B:
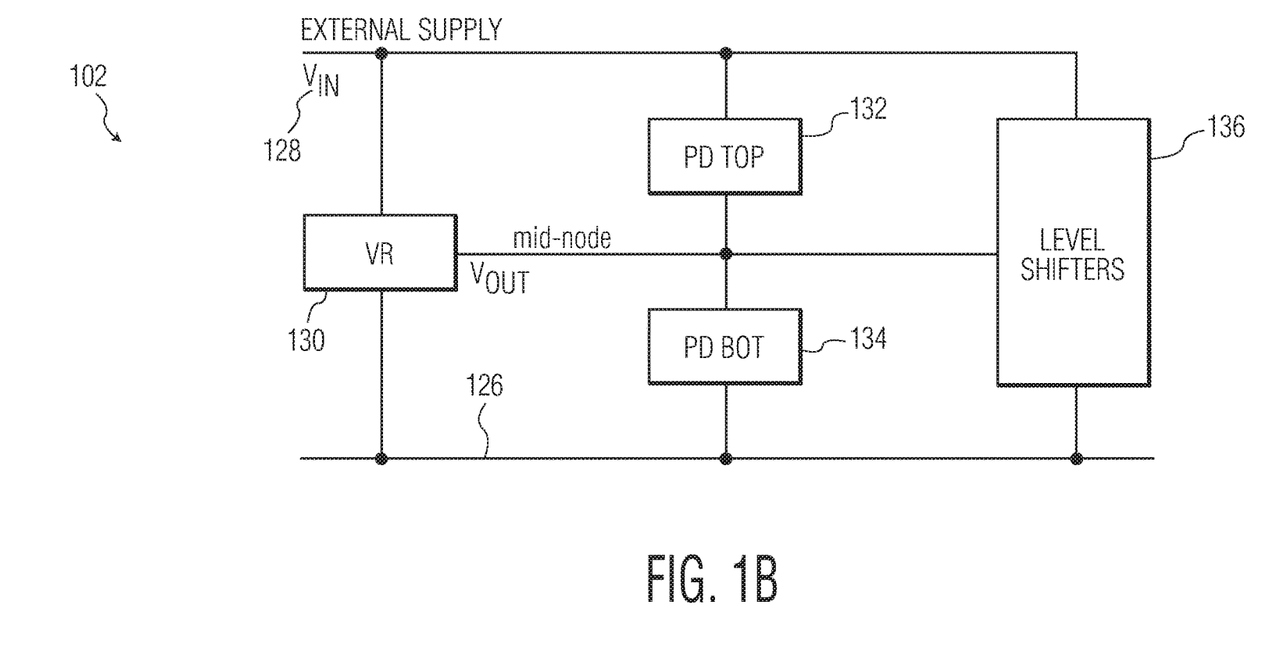

FIGS. 1A and 1B are first 100 and second 102 examples of an apparatus for charge recycling. Charge recycling reduces a circuit's overall energy consumption which is useful for variety of low power circuit designs. The first example 100 in FIG. 1A shows an energy-recycling circuit architecture based on stacked power-domains for static and dynamic power reduction. Such example 100 could be implemented as a stacked memory on top of logic (MToL) set of IP-block power-domains in a digital SOC (System on a Chip) device.

The first example 100 apparatus for charge recycling in FIG. 1A includes: a ground 104; a battery 106; a power-delivery circuit 108; a top power-domain 110; a bottom power-domain 112; and a signal level-shifter circuit 114.

The battery 106 is coupled to the ground 104 and has a first battery voltage (Vbattery/VDDbattery). The power-delivery circuit 108 includes a battery voltage input 116 for receiving Vbattery/VDDbattery. The power-delivery circuit 108 also includes a top-node voltage output 118, for outputting Vhigh and a mid-node voltage output 120 for outputting Vmid.

The top power-domain 110 nominally operates at a top-domain voltage 122 (Vtop) and is coupled to receive the top-node voltage output 118 (Vhigh) and the mid-node voltage output 120 (Vmid).

The bottom power-domain 112 nominally operates at a bottom-domain voltage 124 (Vbottom) and is coupled to receive the mid-node voltage output 120 (Vmid) and to the ground 104.

The signal level-shifter circuit 114 translates signal voltage levels between the top and bottom power-domains 110, 112.

In one example, the power-delivery circuit 108 includes a voltage regulator (e.g. a linear dropout power-converter, a switch mode power supply, or a switched capacitor circuit (SCC)) which converts the battery voltage (Vbattery) to voltage levels Vhigh, Vmid).

In this architecture in Vbattery/VDDbattery from the battery 106 is more than the sum of voltages of the individual top and bottom power-domain 110, 112 stacks (Vtop, Vbottom). In other words, Vbattery≥Vtop+Vbottom.

Note that the mid-node voltage (Vmid), which is sourcing current to one domain and sinking current from another domain, may be exposed to switching or other noise from either the power-delivery circuit 108 or the top and bottom power-domain 110, 112 simultaneously. This can make timing closure in either or both power-domains 110, 112 challenging.

For example, the battery voltage can go as low as 1.6V, while performance demands may require that the individual top and bottom power-domains 110, 112 be maintained at 1V each. In such cases, the charge recycling example 100 of FIG. 1A may not work.

Such a situation can get even more pronounced for certain MCU designs which operate over a range of battery supply voltages (1.6V-5.5V). Thus for the architecture shown in FIG. 1A, Vmid in one example needs to be carefully regulated so as to ensure the voltage integrity of Vmid and ensure timing closure for the IP-blocks in the top and bottom power-domains 110, 112. Such voltage regulation typically increases the device's overall power consumption.

The second example 102 apparatus for charge recycling in FIG. 1B includes: a ground 126; an external supply 128; a voltage regulator (VR) 130; a top power-domain 132; a bottom power-domain 134; and a signal level-shifter circuit 136. In this example 102 the external supply 128 could be a battery which powers the top power-domain 132 and the voltage regulator 130, which maintains Vmid. This second example 102 however operates in a manner similar to the first example 100 in FIG. 1A.

Figure 2:
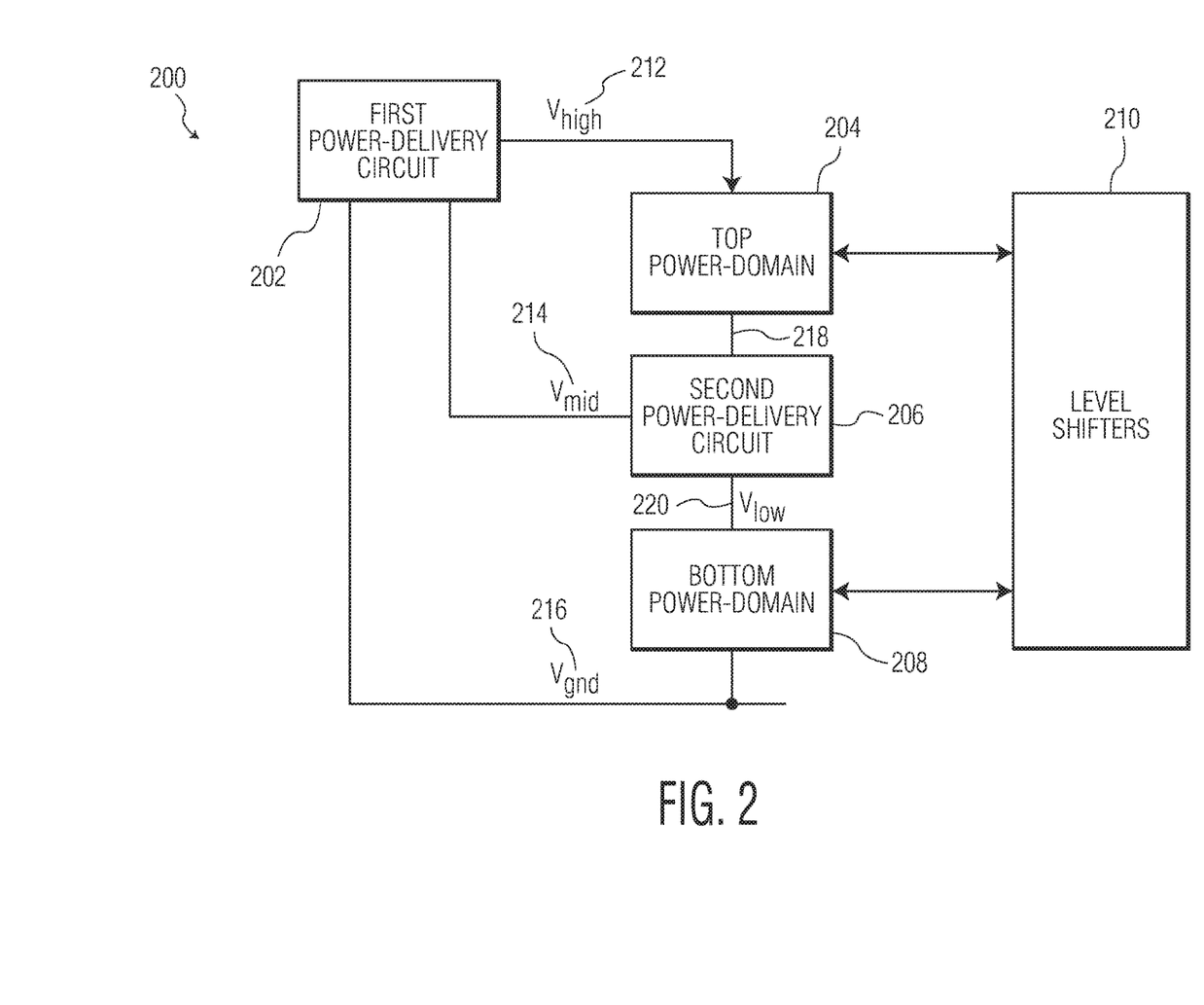
FIG. 2 is a third example of the apparatus for charge recycling.

FIG. 2 is a third example 200 of the apparatus for charge recycling. The apparatus 200 includes: a first power-delivery circuit 202; a top power-domain 204; a second power-delivery circuit 206; a bottom power-domain 208; and a signal level-shifter circuit 210.

The first power-delivery circuit 202 includes: a top-power-domain-node voltage output 212 (Vhigh); a mid-power-domain-node voltage output 214 (Vmid); and a ground-node voltage output 216 (Vgnd).

The top power-domain 204 nominally operates at a top-domain voltage (Vtop) and is coupled to receive the top-node voltage output 212 (Vhigh).

The second power-delivery circuit 206 is coupled to receive the mid-node voltage output 214 (Vmid) and to a low-side output 218 from the top power-domain 204. In combination with the first power-delivery circuit 202, the second power-delivery circuit 206 maintains the top-domain voltage (Vtop). The second power-delivery circuit 206 also includes a low-node voltage output 220 (Vlow).

The bottom power-domain 208 nominally operates at a bottom-domain voltage (Vbottom) and is coupled to receive the low-node voltage output 220 (Vlow) and to the ground-node voltage output 216 (Vgnd). In combination with the first power-delivery circuit 202, the second power-delivery circuit 206 maintains the bottom-domain voltage (Vbottom).

The signal level-shifter circuit 210 translates signal voltage levels between the top and bottom power-domains 204, 208.

In this example 200, the top and bottom power-domains 204, 208 are isolated from each other by the second power-delivery circuit 206, and thus this example apparatus 200 can be applied to voltage-supply noise sensitive applications such as analog and or RF. Due to this isolation, in one example embodiment the top power-domain 204 can be a digital circuit (e.g. an MCU and/or DSP) which generates EMI/noise and the bottom power-domain 208 can be an analog circuit (e.g. radio) needing isolation from such EMI/noise.

The second power-delivery circuit 206 may up or down convert the Vmid 214 voltage to maintain Vtop and Vbottom. With this example apparatus 200, the voltage integrity of top and bottom power-domains 204, 208 are independently maintained. In applications where Vhigh is sufficiently large, the first power-delivery circuit may not need to include an up or down voltage-converter. Thus in one example embodiment, where the first power-delivery circuit 202 is a battery, the overall stacked power-domain apparatus 200 can be optimized for an overall cycle of the battery.

Figure 3:
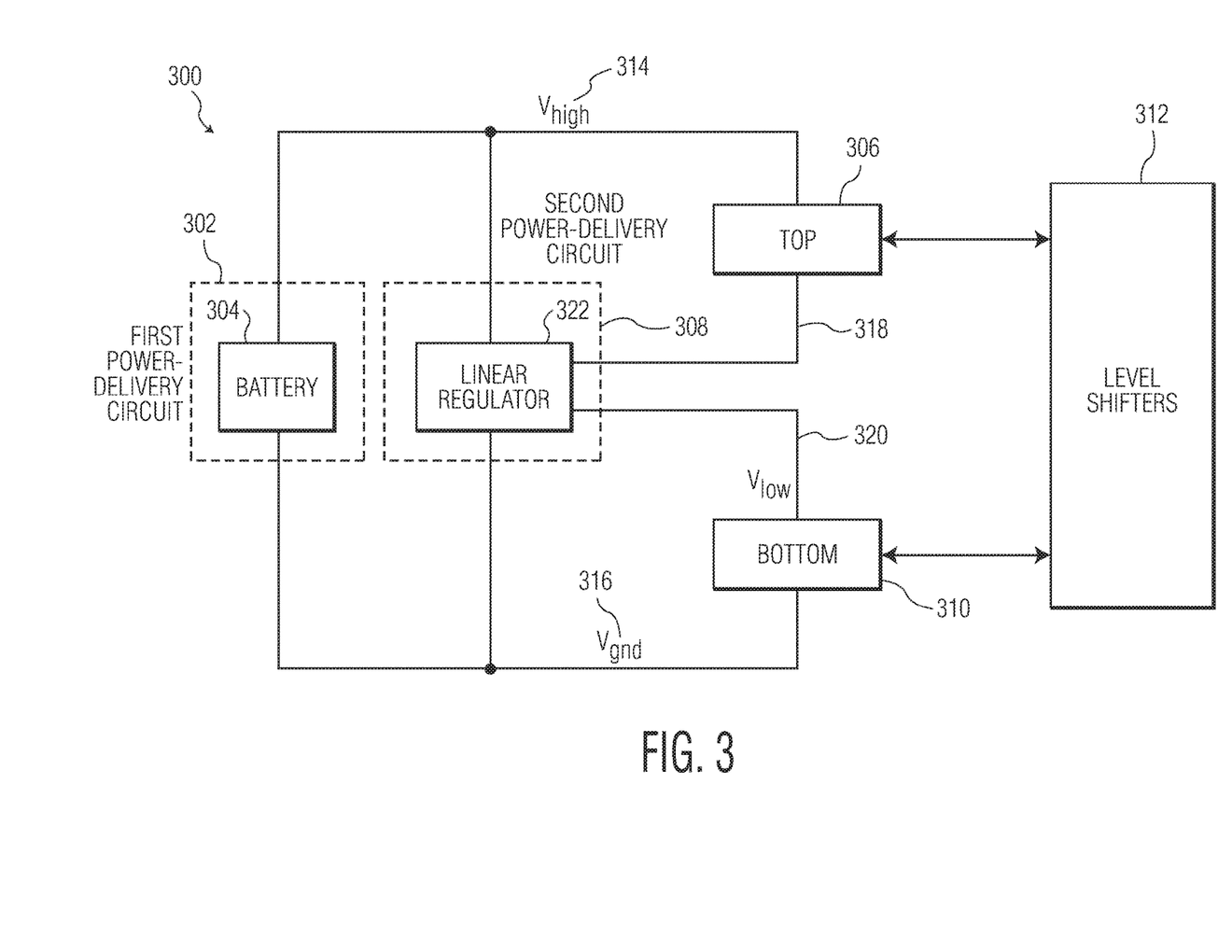
FIG. 3 is a fourth example of the apparatus for charge recycling.

FIG. 3 is a fourth example 300 of the apparatus for charge recycling. The apparatus 300 includes: a first power-delivery circuit 302 having a battery 304; a top power-domain 306; a second power-delivery circuit 308; a bottom power-domain 310; and a signal level-shifter circuit 312.

The first power-delivery circuit 302 includes: a top-power-domain-node voltage output 314 (Vhigh); and a ground-node voltage output 316 (Vgnd).

The top power-domain 306 nominally operates at a top-domain voltage (Vtop) and is coupled to receive the top-node voltage output 314 (Vhigh).

The second power-delivery circuit 308 is coupled to receive the top-node voltage output 314 (Vhigh) and to a low-side output 318 from the top power-domain 306. In combination with the first power-delivery circuit 302, the second power-delivery circuit 308 maintains the top-domain voltage (Vtop). The second power-delivery circuit 308 also includes: a low-node voltage output 320 (Vlow); and a linear regulator 322.

The bottom power-domain 310 nominally operates at a bottom-domain voltage (Vbottom) and is coupled to receive the low-node voltage output 320 (Vlow) and to the ground-node voltage output 316 (Vgnd). In combination with the first power-delivery circuit 302, the second power-delivery circuit 308 maintains the bottom-domain voltage (Vbottom).

The signal level-shifter circuit 312 translates signal voltage levels between the top and bottom power-domains 306, 310.

In a manner similar to that discussed with respect to FIG. 2, the second power-delivery circuit 308 isolates the top and bottom power-domains 306, 310 and thus this apparatus 300 can be applied to voltage-supply noise sensitive applications such as analog and or RF.

In one example embodiment, the second power-delivery circuit 308 uses linear regulator 322 which can sink the noise between the top and bottom power-domains.

Figure 4:
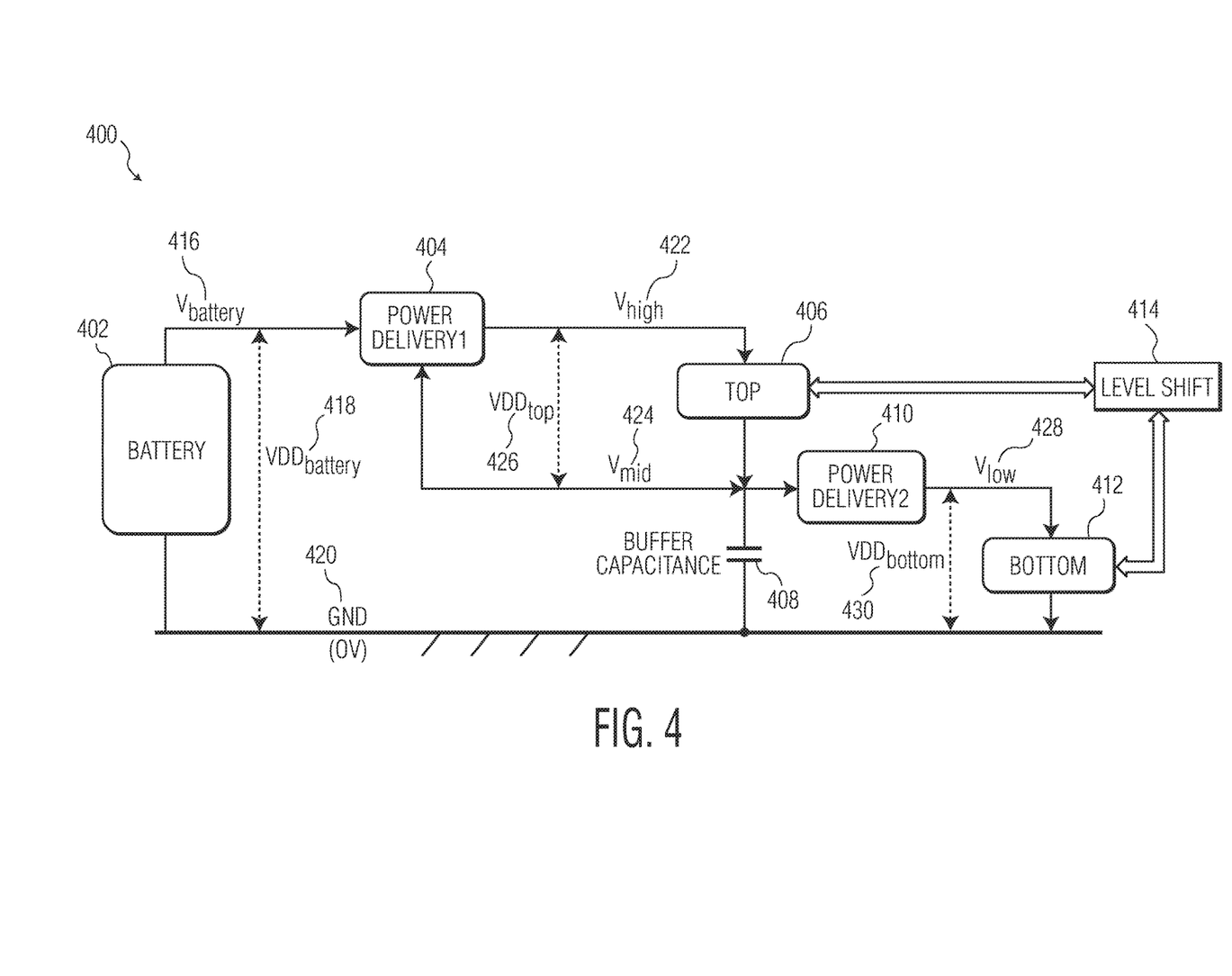
FIG. 4 is a fifth example of the apparatus for charge recycling.

FIG. 4 is a fifth example 400 of the apparatus for charge recycling. The apparatus 400 includes: a battery 402; a first power-delivery circuit 404 (e.g. power-delivery1); a top power-domain 406; a buffer capacitance 408 (i.e. an energy storage element); a second power-delivery circuit 410 (e.g. power-delivery2); a bottom power-domain 412; and a signal level-shifter circuit 414.

The battery 402 outputs Vbattery 416 resulting in VDDbattery 418 with respect to GND 420.

The first power-delivery circuit 404 inputs Vbattery 416 and outputs Vhigh 422 and Vmid 424. The difference between Vhigh 422 and Vmid 424 is VDDtop 426. Thus the first power-delivery circuit 404 maintains the top-domain voltage VDDtop 426.

The top power-domain 406 nominally operates at VDDtop 426 and is coupled to receive Vhigh 422 and Vmid 424.

The buffer capacitance 408 (i.e. an energy storage element) is coupled between Vmid 424 and GND 420. The buffer capacitance 408 stores charge for later use by the first or second power-delivery circuits 404, 410 as necessary to maintain sufficient voltages Vhigh 422, Vmid 424 and Vlow 428 with respect to GND 420.

In one example embodiment, the buffer capacitance 408 has a magnitude at least three times greater than a total system capacitance, so as to provide sufficient charge to the second power-delivery circuit 410 if needed.

The second power-delivery circuit 410 is coupled to receive Vmid 424 and to output Vlow 428. The difference between Vlow 428 and GND 420 is VDDbottom 430.

Either or both the first and second power-delivery circuits 404, 410 can incorporate up or down voltage-converters as needed, depending upon an implementation of the example apparatus 400.

The bottom power-domain 412 nominally operates at VDDbottom 430 and is coupled to receive Vlow 428 and to GND 420. The second power-delivery circuit 410 maintains the bottom-domain voltage VDDbottom 430.

The signal level-shifter circuit 414 translates signal voltage levels between the top and bottom power-domains 406, 412.

In one example, Vmid 424 is adjusted (e.g. up or down converted) by the second power-delivery circuit 410 (e.g. power-delivery2) so as to set Vlow 428 to the correct VDDbottom 430 value for the bottom power-domain 412.

In another example embodiment, the second power-delivery circuit 410 incorporates a boost converter topology based on a switch mode supply (e.g. switch capacitor converter) resulting in VDDtop+VDDbottom≥Vbattery.

Figure 5:
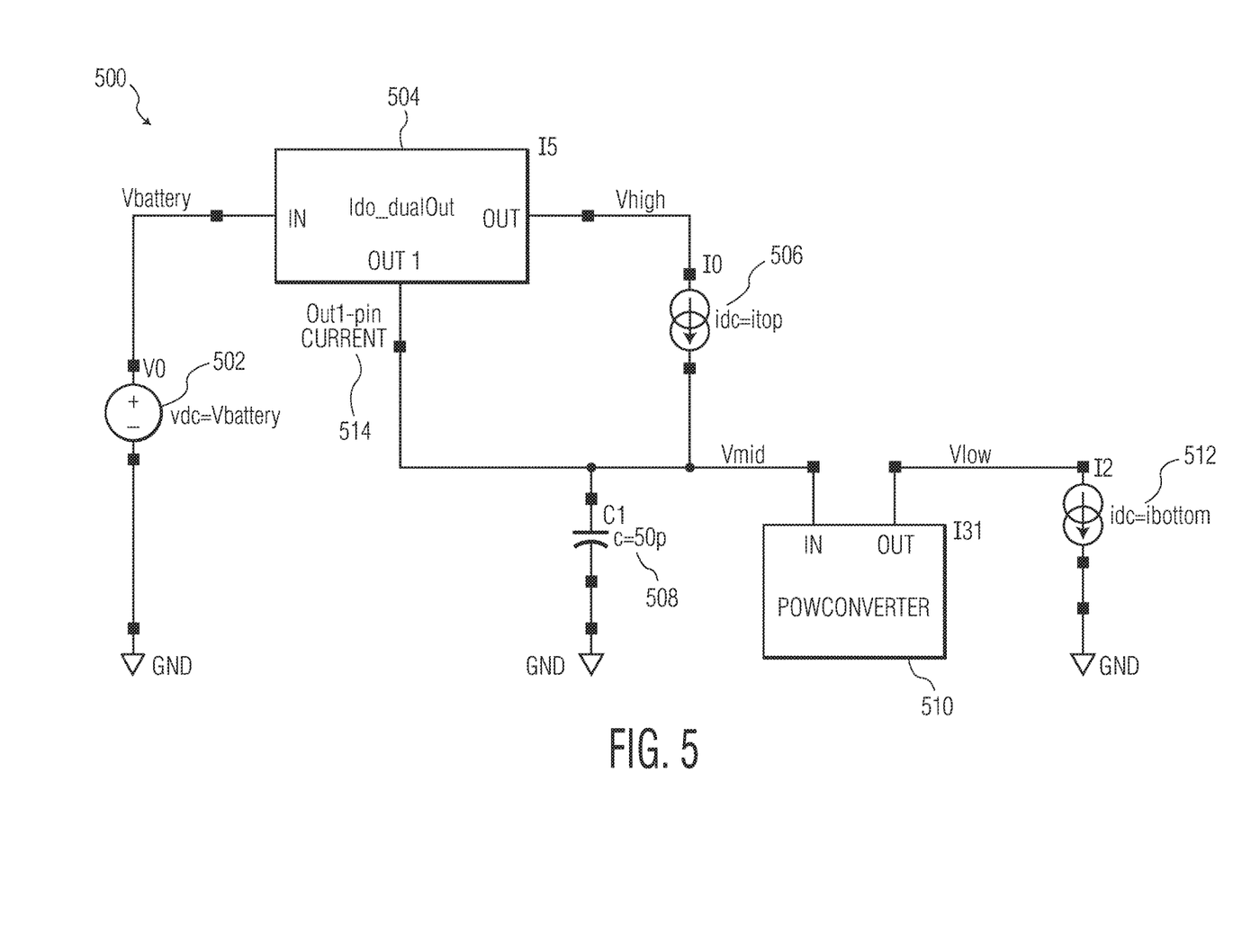
FIG. 5 is a sixth example of the apparatus for charge recycling.

FIG. 5 is a sixth example 500 of the apparatus for charge recycling. The apparatus 500 includes: a battery 502; a first power-delivery circuit 504 (e.g. power-delivery1); a top power-domain 506; a buffer capacitance 508 (i.e. an energy storage element); a second power-delivery circuit 510 (e.g. power-delivery2); and a bottom power-domain 512. A signal level-shifter circuit is not shown.

The sixth example 500 apparatus parallels that of the fifth example 400 of the apparatus in operation, but is instead shown in an example modeled system topology. The first power-delivery circuit 504 includes an out1-pin 514 coupled to the top power-domain 506, buffer capacitance 508, and second power-delivery circuit 510.

Figure 6A:
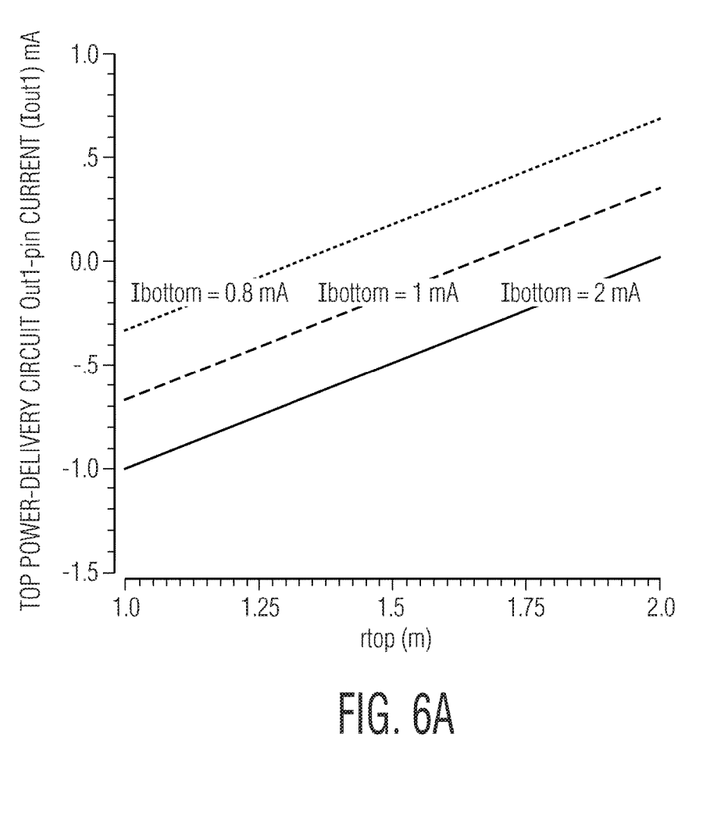
FIGS. 6A and 6B are example graphs of select currents in the apparatus for charge recycling.
Figure 6B:
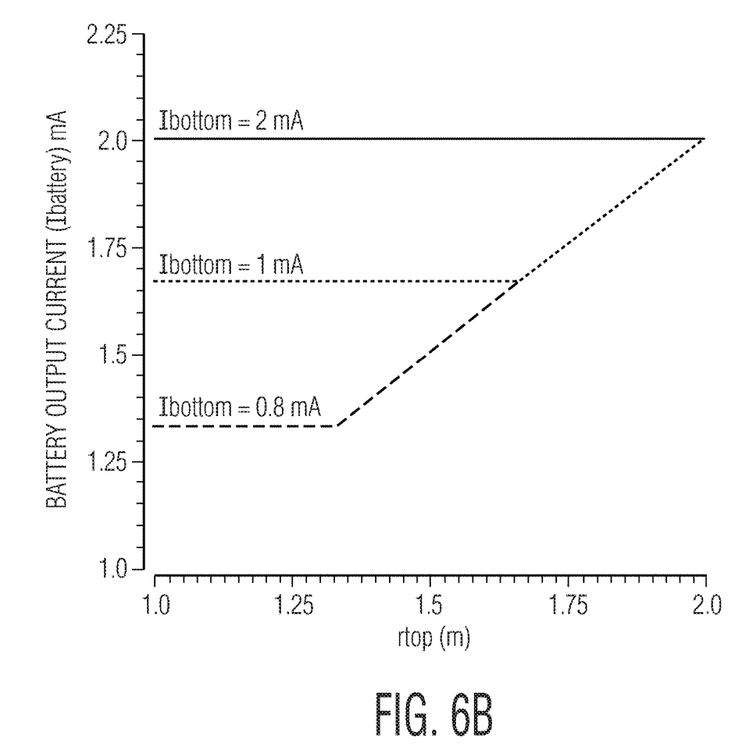

FIGS. 6A and 6B are example graphs of select currents in the apparatus for charge recycling as applied to the sixth example 500 of the apparatus. These graphs have been generated based in the following operational parameters:
  battery 502 voltage of 1.8V;
  top power-domain 506 requiring 1V and consuming average current (Itop);
  bottom power-domain 512 requiring 1V and consuming average current (Ibottom);
  first power-delivery circuit 504 using a low-dropout regulator/power-converter (LDO) providing Vhigh=1.8V;
    first power-delivery circuit 504 maintains 1V across the top power-domain 504, thus Vmid=0.8V;
  second power-delivery circuit 510 uses the 0.8 V Vmid voltage and converts into Vlow=1V at 75% power-conversion efficiency.

FIG. 6A shows a current (Iout1) on the out1-pin 514 of the first power-delivery circuit 504, verses the top power-domain 506 current (Itop), for three values of the bottom power-domain 512 current (Ibottom).

Note, in FIG. 6A, the current sourced/supplied by the out1-pin 514 (Iout1) to the first power-delivery circuit 504 is shown in the graph as negative, while the current drained/sunk by the first power-delivery circuit 504 from the buffer capacitance 508 is shown as positive.

Itop is swept from 1 mA to 2 mA for fixed Ibottom values of 0.8 mA, 1 mA, and 1.2 mA. In this example, when Ibottom is more than Itop, then current is sourced by the out1-pin 514.

FIG. 6B shows a current (Ibattery) provided by the battery 502 to the first power-delivery circuit 504, verses the top power-domain 506 current (Itop), for three values of the bottom power-domain 512 current (Ibottom)

While the example embodiments discussed herein pertain to a set of stacked (i.e. shared current) power-domains, these techniques can also be used for flat (i.e. shared voltage) circuit designs. Also, while these example embodiments discuss power management techniques for just two stacked power-domains, these techniques can be scaled to three or more power-domains as well.

In this specification, example embodiments have been presented in terms of a selected set of details. However, a person of ordinary skill in the art would understand that many other example embodiments may be practiced which include a different selected set of these details. It is intended that the following claims cover all possible example embodiments.

What is claimed is:

1. An apparatus for charge recycling between a first power-domain operating at a first voltage and a second power-domain operating at a second voltage, comprising:
  a first power-delivery circuit configured to supply the first voltage to the first power-domain;
  a second power-delivery circuit coupled to receive power from both the first power-delivery circuit and the first power-domain; and
  a level shifter coupled between the first and second power-domains and configured to translate voltage levels between the first and second power-domains, wherein the first power-delivery circuit is connected to a first terminal of a power source, and wherein the second power-domain is connected to a second terminal of the power source,
  wherein the second power-delivery circuit is configured to supply the second voltage to the second power-domain.

2. The apparatus of claim 1:
  wherein the first voltage plus the second voltage is greater than a maximum operational voltage of the first power-delivery circuit.

3. The apparatus of claim 1:
  wherein the second power-delivery circuit is configured to be coupled between the first power-domain and the second power-domain.

4. The apparatus of claim 3:
  wherein the second power-delivery circuit is configured to isolate the first and second power-domains from each other.

5. The apparatus of claim 4:
  wherein one of the first or second power-domains include a digital circuit and another of the first or second power-domains include an analog circuit.

6. The apparatus of claim 1:
  wherein the first power-delivery circuit includes a battery.

7. The apparatus of claim 1:
  wherein the second power-delivery circuit includes either a boost converter or a switch mode power supply.

8. The apparatus of claim 1:
  wherein at least one of the power-delivery circuits includes an up voltage-converter or down voltage-converter.

9. The apparatus of claim 1:
  wherein the second power-delivery circuit includes a linear regulator.

10. The apparatus of claim 1:
further comprising an energy storage element configured to exchange power with the second power-delivery circuit.

11. The apparatus of claim 10:
wherein the energy storage element and the second power-delivery circuit are configured to source or sink current with respect to either the first power-delivery circuit or the first power-domain.

12. The apparatus of claim 10:
wherein the energy storage element is a capacitor.

13. The apparatus of claim 12:
wherein the capacitor includes a capacitance at least at least three orders of magnitude greater than a total capacitance of the apparatus.

* * * * *